United States Patent
Ortmann et al.

(10) Patent No.: US 9,610,940 B2
(45) Date of Patent: Apr. 4, 2017

(54) VEHICLE DISCONNECT CLUTCH PRE-STROKE STRATEGY

(71) Applicant: FORD GLOBAL TECHNOLOGIES, LLC, Dearborn, MI (US)

(72) Inventors: Walter Joseph Ortmann, Saline, MI (US); Todd McCullough, Bloomfield Hills, MI (US); Brandon R. Masterson, Dexter, MI (US); Kimberly Trice, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/801,124

(22) Filed: Jul. 16, 2015

(65) Prior Publication Data

US 2017/0015308 A1    Jan. 19, 2017

(51) Int. Cl.
| | |
|---|---|
| *B60L 11/00* | (2006.01) |
| *B60W 20/40* | (2016.01) |
| *B60W 10/02* | (2006.01) |
| *B60W 10/06* | (2006.01) |

(52) U.S. Cl.
CPC ............ *B60W 20/40* (2013.01); *B60W 10/02* (2013.01); *B60W 10/06* (2013.01); *B60W 2540/10* (2013.01); *B60W 2540/12* (2013.01); *B60W 2550/308* (2013.01); *Y10S 903/914* (2013.01); *Y10S 903/93* (2013.01)

(58) Field of Classification Search
CPC ......... G06F 19/00; G08G 1/162; G01P 15/14; B60Q 9/008; B60Q 1/447; B60R 21/0132; B60G 2400/104
USPC .................. 701/22, 70; 340/467; 180/65.265
See application file for complete search history.

(56) References Cited

U.S. PATENT DOCUMENTS

| | | | |
|---|---|---|---|
| 6,875,153 B2 | 4/2005 | Jager | |
| 8,364,362 B2 | 1/2013 | Karlsson et al. | |
| 8,364,364 B1 | 1/2013 | Tao et al. | |
| 2013/0297121 A1* | 11/2013 | Reed ................. | B60W 10/02 701/22 |
| 2015/0112524 A1* | 4/2015 | Wang ................ | B60W 10/06 701/22 |

FOREIGN PATENT DOCUMENTS

| | | |
|---|---|---|
| EP | 2829773 A2 | 1/2015 |
| WO | 2015007739 A1 | 1/2015 |

* cited by examiner

*Primary Examiner* — Gertrude Arthur Jeanglaud
(74) *Attorney, Agent, or Firm* — David B. Kelley; Brooks Kushman P.C.

(57) ABSTRACT

A vehicle may include a transmission having an electric machine, an engine, and a controller. The engine may be selectively coupled with the transmission via a disconnect clutch. The controller may be programmed to, in response to an anticipated engine start request, command a disconnect clutch pre-stroke to couple the engine to the transmission prior to an actual engine start request while operating the vehicle in electric mode.

19 Claims, 3 Drawing Sheets

VEHICLE DISCONNECT CLUTCH PRE-STROKE STRATEGY

TECHNICAL FIELD

The present disclosure relates to systems and methods for pre-stroking a disconnect clutch of a vehicle.

BACKGROUND

Hybrid electric vehicles (HEV) may be provided with an internal combustion engine and an electric machine in communication with a high voltage battery. Either or both the internal combustion engine and the electric machine are capable of generating power and torque to propel the HEV. The HEV may be provided with a stop/start strategy that may stop and start the engine during a drive cycle. The stop/start strategy may turn off the engine to improve overall vehicle fuel economy. The engine may remain off until an engine start request is received. The electric machine may be used to provide torque to crank the engine to start the engine in some scenarios. Some HEV's may be provided with a low voltage starter to assist the electric machine in starting the engine at low temperatures.

SUMMARY

A vehicle may include a transmission having an electric machine, an engine and a controller. The engine may be selectively coupled with the transmission via a disconnect clutch. The controller may be programmed to, while operating the vehicle in electric mode and in response to an anticipated engine start request, command a disconnect clutch pre-stroke to couple the engine to the transmission prior to receiving an actual engine start request.

A controller for a vehicle may include input communication channels, output communication channels, and control logic. The input communication channels may be configured to receive a distance to a vehicle forward of the vehicle, and a brake pedal position. The output communication channels may be configured to provide a disconnect clutch command. The control logic may be configured to, in response to the brake pedal position becoming less than a threshold brake pedal position and to the distance becoming greater than a threshold distance, command a disconnect clutch pre-stroke to couple an engine to electric machine. The disconnect clutch may couple the engine to the electric machine prior to receiving an engine start request.

A method of starting an engine selectively coupled to a transmission may include increasing a hydraulic pressure provided to a disconnect clutch and stroking the disconnect clutch. The hydraulic pressure may be provided as a brake pedal position decreases to less than a threshold position. The hydraulic pressure may be increased in response to an anticipated engine start request. The disconnect clutch may be stroked such that disconnect clutch elements come into contact proximate a touch point for a predetermined time period.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
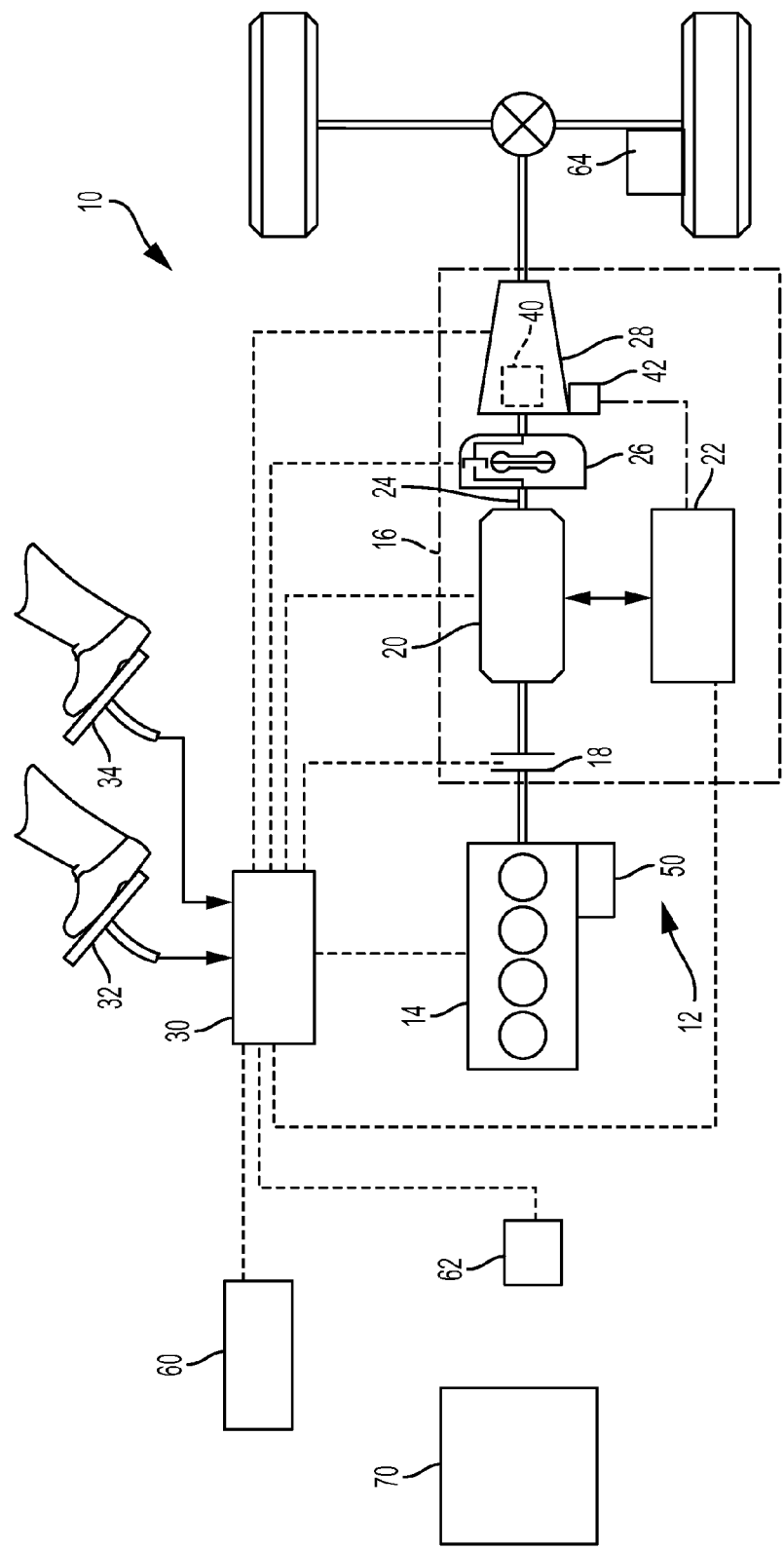
FIG. 1 is a schematic diagram of a vehicle.

Referring to FIG. 1, a schematic diagram of a vehicle 10 is illustrated according to an embodiment of the present disclosure. The vehicle 10 may be configured as a hybrid electric vehicle. Physical placement and orientation of the components within the vehicle 10 may vary. Although the vehicle of FIG. 1 will be particularly described, the strategies in accordance with embodiments of the present disclosure may apply to other vehicle configurations.

The vehicle 10 may include a powertrain 12 having an engine 14 that is operatively connected to a transmission 16. The transmission 16 may include a disconnect clutch 18, an electric machine 20 such as an electric motor-generator, an associated traction battery 22, an input shaft 24, a launch clutch or torque converter 26, and a gear box 28.

The engine 14 generally represents a power source that may include an internal combustion engine such as a gasoline, diesel, or natural gas powered engine, or a fuel cell. The disconnect clutch 18 may selectively mechanically couple the engine 14 to the electric machine 20. The engine 14 may generate an engine power and corresponding engine torque that may be supplied to the electric machine 20 when the disconnect clutch 18 is at least partially engaged. The engine 14 and the electric machine 20 may both act as drive sources for the vehicle 10 by providing torque to the gear box 28 via the input shaft 24.

The electric machine 20 may be implemented by any one of a plurality of types of electric machines, such as a permanent magnet synchronous motor. For example, electric machine 20 may be a permanent magnet synchronous motor. Power electronics condition direct current (DC) power provided by the traction battery 22 to the requirements of the electric machine 20. For example, power electronics may provide three phase alternating current (AC) to the electric machine 20.

The transmission 16 may be configured as a step-ratio transmission using multiple friction elements for transmission gear ratio changes. The transmission 16 may be configured to produce multiple forward and reverse gears via multiple gearing elements within the gear box 28.

The torque converter 26 may be positioned between the electric machine 20 and the gear box 28. The torque converter 26 may provide torque multiplication during launch events. The torque converter 26 may also perform torsional isolation to the driveline such that the driveline is isolated from disturbances.

A controller 30 may be provided and configured to control the friction elements of the transmission 16, more specifically the gear box 28. The controller 30 may determine transmission gear ratio changes based on vehicle acceleration, vehicle speed, engine speed, motor generator speed, powertrain torque/power, or a driver request provided by an accelerator pedal 32, a brake pedal 34 or a gear selector.

The controller 30 may be configured to dictate the operational states of the vehicle 10 or the powertrain 12. The controller 30 may interpret the driver request from the accelerator pedal 32, to determine a driver's intention for demanded powertrain torque or power to propel the vehicle 10. The controller 30 may allocate torque split commands between the engine 14 and/or the electric machine 20 to satisfy the driver request. In general, depressing and releasing the accelerator pedal 32 may generate an accelerator pedal position signal that may be interpreted by the controller 30 as a demand for increased power/torque or decreased power/torque, respectively to propel the vehicle 10.

The controller 30 may interpret the driver request from the brake pedal 34, to determine a driver's intention for braking torque to reduce vehicle speed or stop the vehicle 10. The controller 30 may allocate braking torque between a friction braking system and the powertrain 12 through regenerative braking. In general, depressing and releasing the brake pedal 34 may generate a brake pedal position signal that may be interpreted by the controller 30 as a demand for brake torque or decreased power/torque from the powertrain 12, to reduce vehicle speed or stop the vehicle 10. Based at least upon input from the accelerator pedal 32 or the brake pedal 34, the controller 30 may operate the powertrain 12 in various modes to satisfy the driver request.

The controller 30 may be configured to operate the powertrain 12 in a first mode. The disconnect clutch 18 may be at least partially engaged to operatively couple the engine 14 to the electric machine 20, while the powertrain 12 is operating in the first mode. The coupling may transfer a portion of the engine torque through the disconnect clutch 18 to the electric machine 20, and then from the electric machine 20 through the torque converter 26 and gear box 28. Combustion in the engine 14 may be enabled or otherwise on during the first mode.

The controller 30 may issue commands to power electronics such that the electric machine 20 may assist the engine 14 by providing additional torque to the input shaft 24, in the first mode. The controller 30 may issue commands to allocate an output torque of both the engine 14 and the electric machine 20 such that the combination of both output torques satisfies an accelerator pedal 32 input from the driver. The first mode of powertrain operation may be referred to as a "hybrid mode."

The controller 30 may be configured to operate the powertrain 12 in a second mode. The disconnect clutch 18 may isolate the engine 14 from the remainder of the powertrain 12, while operating the powertrain 12 in the second mode. Combustion in the engine 14 may be disabled or otherwise off during the second mode to conserve fuel. The traction battery 22 may transmit stored electrical energy through power electronics to the electric machine 20 such that the electric machine 20 acts as the sole power source to propel the vehicle 10.

The controller 30 may issue commands to power electronics such that the electric machine 20 is enabled to provide positive or negative torque to the input shaft 24 in the second mode. The second mode of powertrain operation in which the electric machine 20 is the sole motive source may be referred to as an "electric mode".

The controller 30 may be configured to operate the powertrain in a third mode. The electric machine 20 may be operated to convert kinetic energy from the powertrain 12 during braking events into electric energy that may be stored in the traction battery 22. The electric machine 20 rotational energy from spinning of the transmission output shaft through the gear box 28 and is converted into electrical energy for storage in the traction battery 22.

The controller 30 may issue commands to the electric machine 20 to selectively apply a drag or negative torque ("regenerative torque") to contribute to vehicle deceleration during a regenerative braking event. The third mode of powertrain operation in which a regenerative torque is applied may be referred to as a "regeneration mode".

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the powertrain 12 or vehicle 10.

The controller 30 may control/command the disconnect clutch 18 to couple the engine 14 with the electric machine 20. The controller 30 may control/command the disconnect clutch 18 to de-couple the engine 14 from the electric machine 20. In describing the control of the disconnect clutch 18, several references below are made to a "stroked" clutch and an "unstroked" clutch. The term "unstroked" is intended to mean that, in the case of a hydraulic disconnect clutch, no clutch pressure is present in the clutch and the engine 14 and electric machine 20 are decoupled from one another. An unstroked disconnect clutch 18 may be depressurized, may have minimal drag, and may have a reduced capacity to transmit torque from the engine 14 to the gear box 28. The term "stroked clutch" is intended to mean that, in the case of a hydraulic disconnect clutch, some hydraulic pressure is present in the disconnect clutch 18 and the engine 14 and electric machine 20 are coupled to each other. A stroked disconnect clutch 18 may be pressurized and have the capacity to transmit torque from the engine 14 to the gear box 28.

The terms "stroked" and "unstroked" may apply not only to hydraulic clutches, but to other types of clutches as well. For example, the disconnect clutch 18 may be a pneumatic clutch or electro-mechanical clutch. The term "unstroked" may mean that the disconnect clutch 18 is inactive or otherwise not prepared to transmit torque through the disconnect clutch 18. The term "stroked" may mean that the disconnect clutch 18 is active or otherwise prepared such that torque may be transmitted through the disconnect clutch 18.

Generally, when the engine 14 is off, the disconnect clutch 18 may be unstroked. The disconnect clutch 18 in an unstroked state may reduce drag or loss on the engine 14 or the electric machine 20. Generally, when an engine start request is made, the disconnect clutch 18 may be stroked and dithered in preparation to couple the engine 14 to the electric machine 20. The electric machine 20 may receive power from the traction battery 22 to spin the electric machine 20. Torque produced by the spinning of the electric machine 20 may be transferred to the engine 14 to turn or crank the engine 14. As increased power is provided to the electric machine 20, the electric machine 20 speed may increase and subsequently increase the transmission pump 40 speed. The transmission pump 40 may supply or provide additional hydraulic pressure to the disconnect clutch 18 to increase the torque carrying capacity of the disconnect clutch 18. As the hydraulic pressure provided to the disconnect clutch 18 is increased, clutch elements of the disconnect clutch 18 may be "stroked" from a disengaged or "unstroked" state to an engaged or "stroked" state. The clutch elements may be clutch plates, friction elements, or pistons. The clutch elements may become closer together as they are stroked and may engage each other to operatively couple the engine 14 to the electric machine 20. In at least one embodiment, an auxiliary electric pump 42 may be provided. The auxiliary electric pump 42 may be configured to provide hydraulic pressure to the disconnect clutch 18. The auxiliary electric pump 42 may have a lower capacity than the transmission pump 40.

As the hydraulic pressure provided to the disconnect clutch 18 is increased and power supplied to the electric machine 20 is increased, the electric machine 20 rotational speed may be increased up to a target engine cranking speed. Upon the engine 14 achieving the target engine cranking speed, the engine 14 may be fueled and fired to accelerate to a synchronous speed. The synchronous speed may be the operating point wherein both sides of the disconnect clutch 18 are rotating at the same speed. At this operating point, the engine 14 and the electric machine 20 may be rotating at the same speed and the disconnect clutch 18 may be locked. A no slip condition may exist between the engine 14 and the electric machine 20.

A low voltage starter 50 may assist the electric machine 20 to start the engine 14. The low voltage starter 50 may begin to rotate the engine 14 while at least one of the transmission pump 40 and the auxiliary electric pump 42 is being primed. Upon the transmission pump 40 being primed, hydraulic pressure may be provided to the disconnect clutch 18 and the electric machine 20 may be coupled to the engine 14 and the starting process completed. This scheme may require additional components including a low voltage battery and wiring sized for the cold cranking current provided by the low voltage battery.

The controller 30 may be provided with a disconnect clutch pre-stroke strategy in an effort to avoid the additional cost and weight associated with implementing the low voltage starter 50 and to reduce the total engine start time. The disconnect clutch pre-stroke strategy may be embodied as control logic that may result in the controller 30 outputting a disconnect clutch pre-stroke command. The disconnect clutch pre-stroke command may be configured to request that the disconnect clutch 18 be cycled and stroked in response to an anticipated engine start request associated with an anticipated accelerator pedal tip-in or changes in brake pedal position while the vehicle is in motion or at rest and operational.

The clutch elements of the disconnect clutch 18 may be stroked in anticipation of an engine start request. An engine start request may be anticipated as a brake pedal position decreases, a brake pedal 34 tip-out greater than a threshold tip-out, or a brake pedal release rate greater than a threshold brake pedal release rate. For example, as the brake pedal position approaches zero or is completely released, the hydraulic pressure provided to the disconnect clutch 18 may be increased. The hydraulic pressure may be provided to the disconnect clutch 18 to stroke the disconnect clutch 18 by at least one of the transmission pump 40 and the auxiliary electric pump 42. The stroking of the disconnect clutch 18 may result in the clutch elements engaging with a reduced or minimal torque carrying capacity. The clutch elements coming into contact with minimal or reduced torque carrying capacity may be referred to as the "touch point". The minimal torque carrying capacity may result in a slip condition between the clutch elements such that the engine 14 may be operatively coupled with the electric machine 20 with reduced torque carrying capacity. The reduced torque carrying capacity of the disconnect clutch 18 may inhibit the electric machine 20 from transmitting torque to the engine 14 through the disconnect clutch 18.

The clutch elements may be maintained at the "touch point" for a predetermined time period. The predetermined time period may be varied based on many factors including the state of charge of the traction battery 22 or the ambient temperature. An engine start request may be associated with an accelerator pedal tip-in or a driver commanded engine start request. The engine start request received during the predetermined time period may result in the torque carrying capacity of the disconnect clutch 18 being increased or "capacitized" such that a no-slip condition occurs between the clutch elements.

In at least one embodiment, the controller 30 may be provided with an adaptive cruise control module or an adaptive cruise control system. The adaptive cruise control system may be in communication with a user interface 60, a front sensor 62, and a vehicle speed sensor 64. The adaptive cruise control system may attempt to operate the powertrain 12 or other vehicle subsystems to maintain an operator specified vehicle speed input via the user interface 60 and/or to maintain a target following distance between the vehicle 10 and a target vehicle 70 forward of the vehicle 10. The target vehicle 70 may be another vehicle within a predetermined range forward of the vehicle 10 or within a predetermined range behind the vehicle 10 detected by the front sensor 62. The front sensor 62 may be an object detection sensor such as a camera or vision system, a parking sensor, a proximity sensor, a side looking sensor, an ultrasonic sensor, a radar, a light detection and ranging (LIDAR) device, radio detection and ranging (RADAR) device, laser scanner, or a combination thereof.

The adaptive cruise control system may receive a vehicle speed from a vehicle speed sensor 64. The vehicle speed sensor 64 may be a wheel speed sensor disposed proximate a vehicle wheel. The adaptive cruise control system may attempt to minimize any differences between the operator specified vehicle speed and the vehicle speed measured by a vehicle speed sensor 64. The adaptive cruise control system may also adjust a vehicle speed based on the following distance between the vehicle 10 and the target vehicle 70. For example, if the distance between the vehicle 10 and the target vehicle 70 becomes greater than a threshold following distance, the adaptive cruise control system may increase the vehicle speed to maintain the target following distance. Should the distance between the vehicle 10 and the target vehicle 70 become less than the threshold distance, the adaptive cruise control system may decrease the vehicle speed to maintain the target following distance.

The controller 30 may receive information from the front sensor 62 to improve prediction of an anticipated engine start request. The controller 30 may include input communication channels configured to receive signals indicative of a brake pedal position, an accelerator pedal position, a distance from the vehicle 10 to the target vehicle 70, and a vehicle speed. The controller 30 may include output communication channels configured to provide signals indicative of a command to stroke a friction element of the disconnect clutch 18 and to start the engine 14. For example, in response to a brake pedal tip-out and to the target vehicle 70 within a distance less than the target following distance, the disconnect clutch 18 may not be stroked and the engine 14 may remain de-coupled from the electric machine 20. The disconnect clutch 18 may not be stroked because it may be unlikely that an operator of the vehicle 10 may tip-in to the accelerator pedal 32 subsequent to a brake pedal tip-out that may be associated with an engine start request. In response to a brake pedal tip-out and to the target vehicle 70 within a distance greater than the target following distance or the target vehicle 70 not detected by the front sensor 62, the disconnect clutch 18 may be stroked to couple the engine 14 to the electric machine 20 with minimal torque carrying capacity. The disconnect clutch 18 may be stroked because it may be likely that an operator of the vehicle 10 may tip-in to the accelerator pedal 32 subsequent to a brake pedal tip-out that may be associated with an engine start request.

Subsequent to the operative coupling of the engine 14 to the electric machine 20, the traction battery 22 may be commanded to provide power to the electric machine 20 to operate the transmission pump 40 to provide transmission hydraulic pressure to the transmission 16. The transmission pump 40 may have a much larger capacity than the auxiliary electric pump 42. The electric machine 20 may require that a large amount of power be provided to spin the electric machine 20 to operate the transmission pump 40 to provide hydraulic pressure to the transmission 16 and ultimately the disconnect clutch 18.

The controller 30 may determine or calculate a target engine cranking speed at which an engine start may be achieved. The target engine cranking speed may be a target speed determined from characterization tests at various ambient temperatures. These target values may be provided as part of a look-up table.

The controller 30 may command that the traction battery 22 provide power to the electric machine 20 to spin the electric machine 20 at a speed proximate a target engine cranking speed. The amount of traction battery power provided may be based on the ambient temperature or temperature associated with the vehicle 10. In at least one embodiment, the traction battery power provided may be based on a driver demand associated with an accelerator pedal position. As the amount of traction battery power provided to the electric machine 20 increases, the speed of the electric machine 20 may increase.

As the electric machine 20 speed increases, the transmission pump 40 may increase the hydraulic pressure provided to the disconnect clutch 18. The increased hydraulic pressure may increase the torque carrying capacity of the disconnect clutch 18. The increase in the torque carrying capacity of the disconnect clutch 18 may increase the transfer of the rotational inertia of the electric machine 20 to the engine 14 to increase the rotational speed of the engine 14. The controller 30 may then command an engine start by requesting that fuel be provided to the engine 14 to initiate combustion.

The controller 30 may command that the disconnect clutch 18 be de-stroked if an engine start request or an accelerator pedal tip-in greater than a threshold tip-in is not received during the predetermined time period or prior to the expiration of the predetermined time period. The controller 30 may command that hydraulic pressure no longer be provided to the disconnect clutch 18 or at least partially release the hydraulic pressure provided to the disconnect clutch 18 to de-stroke the disconnect clutch 18. The cessation of hydraulic pressure may operatively decouple the engine 14 from the electric machine 20.

Referring to FIGS. 2A-2D, corresponding time plots of accelerator and brake pedal position, vehicle speed, disconnect clutch pressure, and engine state, respectively, are shown. The plots may correspond in time and demonstrate an exemplary embodiment of the disconnect clutch pre-stroke strategy.

Figure 2:
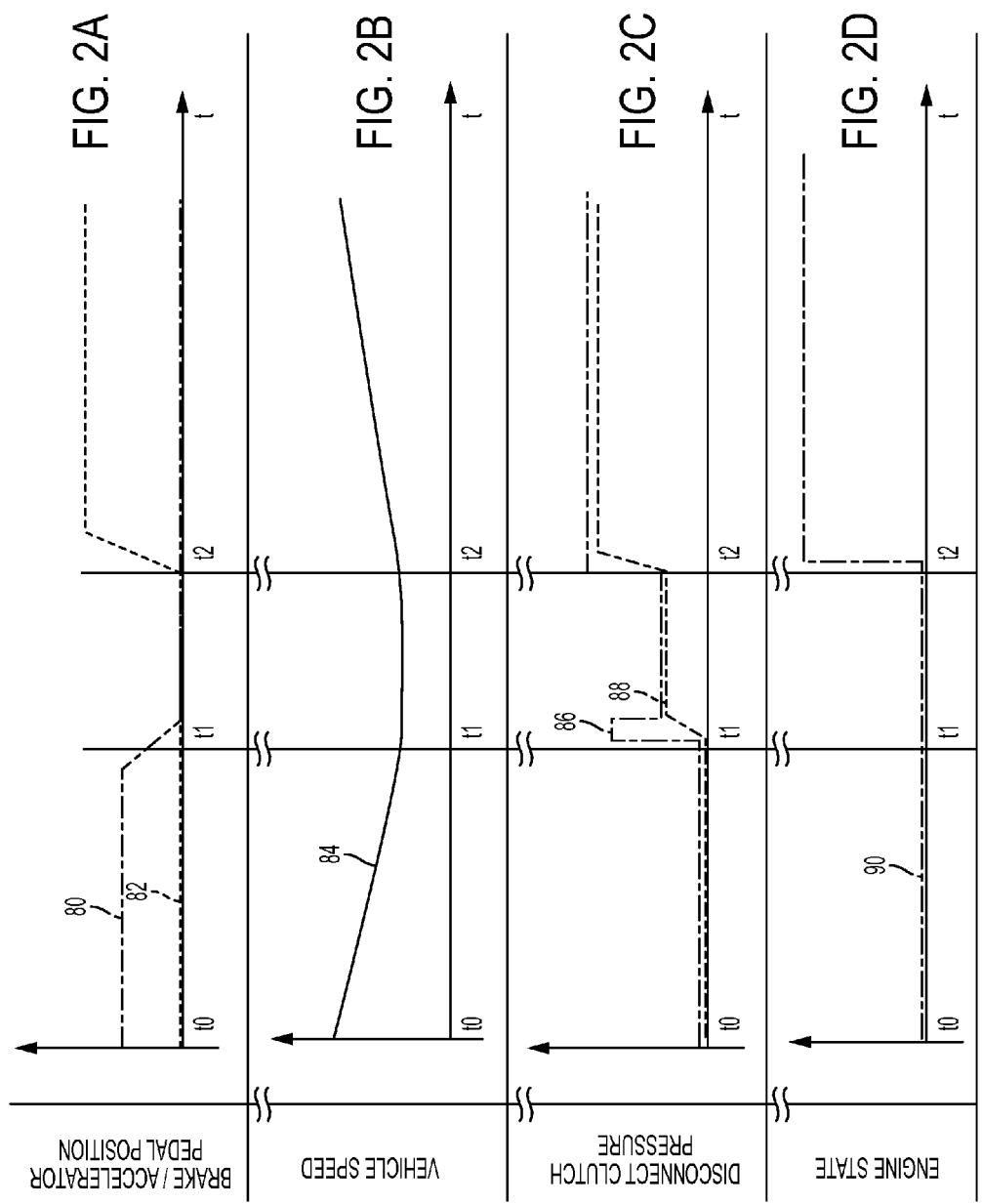
FIGS. 2A-2D are corresponding time plots showing a powertrain system response.

FIG. 2A is a plot of brake pedal position 80 and accelerator pedal position 82. At time t0, the engine 14 may be disconnected from the electric machine 20 and the accelerator pedal 32 released (held at a constant position less than a threshold accelerator pedal position) and the brake pedal 34 may be depressed (held at a constant position greater than a threshold brake pedal position). Proximate time t1, the accelerator pedal 32 may remain released (held at a constant accelerator position 82 less than a threshold accelerator pedal position) and at least one of the brake pedal 34 may be released (brake pedal position 80 greater than a threshold brake pedal position) and an engine start request may be anticipated. Proximate time t2, accelerator pedal position 82 may be increased or tipped-in greater than a threshold accelerator pedal position. The brake pedal position 80 may be held constant. An engine start request may be associated with the change in accelerator pedal position 82 greater than a threshold accelerator pedal position. A powertrain 12 power or torque demand associated with the change in accelerator pedal position 82 greater than the threshold accelerator pedal position may request a powertrain output power or torque greater than the capability of the electric machine 20 operating alone. Therefore, an engine start may be required to provide sufficient powertrain output power or torque to satisfy the demand associated with the change in accelerator pedal position 82 greater than the threshold accelerator pedal position.

FIG. 2B is a plot of vehicle speed 84. Proximate time t0, the vehicle speed 84 may begin to decrease in response to at least one of an accelerator pedal 32 tip-out greater than a threshold accelerator pedal position and a brake pedal 34 tip-in less than a threshold brake pedal position. Proximate time t1, the brake pedal 34 may be tipped-in greater than a threshold brake pedal position such that the vehicle speed 84 may be further reduced. The brake pedal position 80 may be held substantially constant such that the vehicle speed 84 remains substantially constant. Proximate time t2, the vehicle speed 84 may increase as at least one of the accelerator pedal position 82 may be increased or tipped-in greater than a threshold accelerator pedal position and the brake pedal position 80 may also be decreased, the brake pedal tipped-out greater than a threshold brake pedal position, or a brake pedal position release rate greater than a threshold brake pedal release rate.

FIG. 2C is a plot of the disconnect clutch pressure, specifically, the commanded disconnect clutch pressure 86 and the measured disconnect clutch pressure 88. At time t0, the engine 14 may be disconnected from the electric machine 20. Proximate time t1, in response to a an anticipated engine start request associated with an anticipated accelerator pedal tip-in or changes in brake pedal position, the controller 30 may command that the disconnect clutch 18 be stroked by commanding that hydraulic pressure be provided to the disconnect clutch 18. Hydraulic pressure may be provided to the disconnect clutch 18 by the transmission pump 40 or the auxiliary electric pump 42 such that the clutch elements of the disconnect clutch 18 may cycle, engage, and be held at the "touch point." The hydraulic pressure may continue to be provided to the disconnect clutch 18 as the controller 30 waits for an engine start request.

Proximate time t2, an engine start request may be received by or commanded by the controller 30. Additional hydraulic pressure may be commanded to be provided to the disconnect clutch 18 to increase the torque carrying capacity of the disconnect clutch 18 to facilitate the starting of the engine 14 using the electric machine 20.

FIG. 2D is a plot of the engine state 90. At time t0, the engine state 90 may be off as the powertrain 12 is operated in electric mode. Proximate time t1, the engine state 90 may remain off as the powertrain 12 continues to be operated in electric mode as the brake pedal position 80 changes and the accelerator pedal position 82 remains substantially constant. Proximate time t2, in response to the engine start request, traction battery power may be provided to the electric machine 20 to spin the electric machine 20 and the engine 14 as the commanded disconnect clutch pressure 86 is further increased. The increase of the measured disconnect clutch pressure 88 and the power provided to the electric machine 20 may further increase the rotational speed of both the engine 14 and the electric machine 20. Upon the engine speed achieving a target engine cranking speed associated with the engine start request, the engine 14 may be fueled and fired to change the engine state 90 to on. The powertrain 12 may change operation states from electric mode to hybrid mode.

Figure 3:
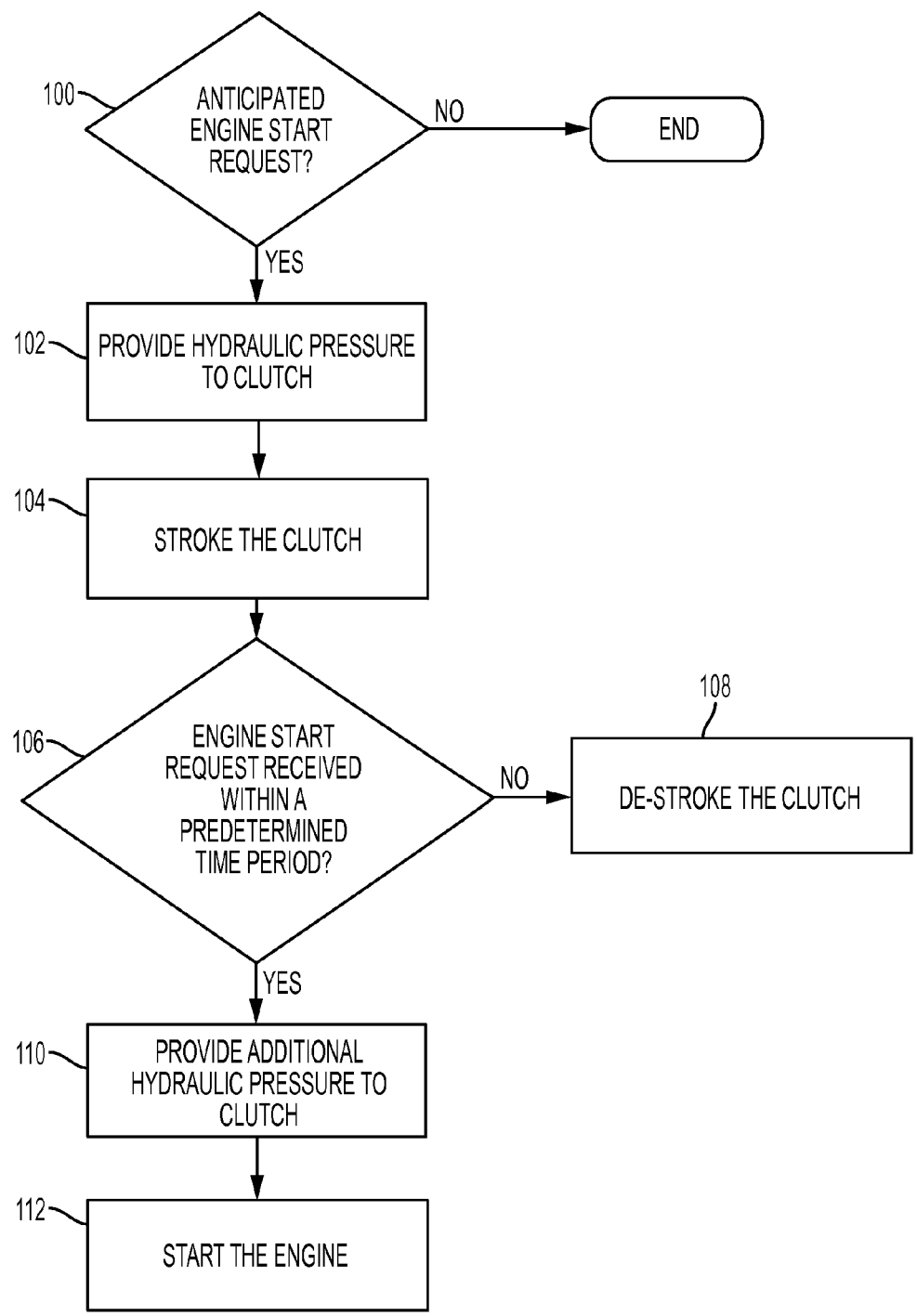
FIG. 3 is a flow chart of an algorithm for starting an engine selectively coupled to a transmission.

Referring to FIG. 3, a flowchart of an exemplary method of starting the vehicle 10 is shown. The method may be executed by the controller 30 and may be implemented as a closed loop control system. For brevity, the method will be described in the context of a single method iteration below.

The method may monitor and receive an accelerator pedal position from an accelerator pedal position sensor disposed proximate the accelerator pedal 32, a brake pedal position and/or a brake pedal release rate from a brake pedal position sensor disposed proximate the brake pedal 34, a distance between the vehicle 10 and a target vehicle 70 from the front sensor 62, and a vehicle speed from the vehicle speed sensor 64. At block 100, the method may determine if an engine start request is anticipated. An engine start request may be anticipated if a brake pedal position becomes less than a threshold brake pedal position or a brake pedal release rate is greater than a threshold brake pedal release rate and a distance between the vehicle 10 and the target vehicle 70 becomes greater than a threshold following distance, while the vehicle 10 is in motion or moving. Should an engine start request not be anticipated the method may end. An engine start request may not be anticipated if a brake pedal position becomes less than a threshold brake pedal position and a distance between the vehicle 10 and the target vehicle 70 is less than or approximately equal to the threshold following distance. Additionally, an engine start request may not be anticipated if a brake pedal position increases or becomes greater than the threshold brake pedal position. If an engine start request is anticipated the method may continue to block 102.

At block 102 hydraulic pressure may be provided to the disconnect clutch 18. The provision of the hydraulic pressure may be coordinated with or inversely proportional to a decrease in the brake pedal position such that as the brake pedal position decreases, the hydraulic pressure provided to the disconnect clutch 18 increases. The hydraulic pressure may be provided by at least one of the transmission pump 40 and the auxiliary electric pump 42.

At block 104 the provision of hydraulic pressure to the disconnect clutch 18 may stroke the disconnect clutch 18. The disconnect clutch 18 may be stroked such that a combination of opposing disconnect clutch elements may come into contact proximate a touch point for a predetermined time period. The combination of opposing disconnect clutch elements may come into contact proximate the touch point with a reduced torque carrying capacity. The reduced torque carrying capacity may result in a slip condition between the opposing disconnect clutch elements.

At block 106 the method may determine if an engine start request is received within the predetermined time period. Should the predetermined time period expire without receiving an engine start request or an accelerator pedal tip-in greater than the threshold accelerator pedal tip-in, the method may continue to block 108. At block 108 the method may de-stroke the disconnect clutch 18. De-stroking the disconnect clutch 18 may at least partially reduce the hydraulic pressure provided to the disconnect clutch 18 or cease the provision of hydraulic pressure provided to the disconnect clutch 18 such that the engine 14 is operatively decoupled from the transmission 16 and/or the electric machine 20. If an engine start request is received within the predetermined time period, the method may continue to block 110.

At block 110 additional hydraulic pressure may be provided to the disconnect clutch 18 to capacitize the disconnect clutch 18. The additional hydraulic pressure may be provided to the disconnect clutch by the transmission pump 40 operatively coupled to the electric machine 20. The provision of additional hydraulic pressure to the disconnect clutch 18 may increase the torque carrying capacity of the disconnect clutch 18. The torque carrying capacity may increase as additional traction battery power is supplied to the electric machine 20. Additionally, the traction battery power supplied to the electric machine 20 may be based on a driver demand associated with a current accelerator pedal position.

The torque carrying capacity of the disconnect clutch 18 may continue to increase as an engine speed and M/G speed increases. The further increase in the torque carrying capacity of the disconnect clutch 18 may result in a no slip condition occurring between the opposing disconnect clutch elements. The engine speed and the electric machine speed may continue to increase until a target engine speed is reached or a synchronous speed is reached. In response to achieving the synchronous speed, the engine 14 may be fueled and started at block 112. The engine 14 may be started such that additional propulsive torque may be provided to satisfy a driver demand associated with the current accelerator pedal position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a transmission having an electric machine;
   an engine selectively coupled with the transmission via a disconnect clutch; and
   a controller programmed to, while operating the vehicle in electric mode and in response to an anticipated engine start request, command a disconnect clutch pre-stroke to couple the engine to the transmission prior to receiving an actual engine start request.

2. The vehicle of claim 1 wherein a command for the disconnect clutch pre-stroke includes a command to provide hydraulic pressure to the disconnect clutch to hold disconnect clutch elements proximate a touch point.

3. The vehicle of claim 1 wherein the anticipated engine start request is based on a brake pedal position becoming less than a threshold position.

4. The vehicle of claim 2 wherein the controller is further programmed to, in response to not receiving a signal indicative of an accelerator pedal tip-in greater than a threshold tip-in within a predetermined time period from the anticipated engine start request, at least partially release the hydraulic pressure provided to the disconnect clutch to decouple the engine from the transmission.

5. The vehicle of claim 4 wherein the controller is further programmed to, in response to a signal indicative of an accelerator pedal tip-in greater than a threshold tip-in during the predetermined time period, command an engine start.

6. The vehicle of claim 1 wherein the anticipated engine start request is based on a distance between the vehicle and a target vehicle being greater than a threshold distance and a brake pedal position becoming less than a threshold position.

7. A vehicle controller comprising:
input communication channels configured to receive a distance to a vehicle forward of the vehicle and a brake pedal position; and
control logic configured to, in response to the brake pedal position becoming less than a threshold brake pedal position and the distance becoming greater than a threshold distance, generate a command to pre-stroke a disconnect clutch to couple an engine to an electric machine prior to receiving an engine start request.

8. The controller of claim 7 wherein the input communication channels are further configured to receive an accelerator pedal position and wherein the control logic is further configured to, in response to the accelerator pedal position being greater than a threshold accelerator pedal position, generate a command to start the engine and a command to increase hydraulic pressure to the disconnect clutch to increase a torque carrying capacity of the disconnect clutch.

9. The controller of claim 7 wherein the control logic is further configured to, in response to the brake pedal position becoming less than the threshold brake pedal position and the distance becoming less than the threshold distance, to operate the electric machine to provide a propulsive torque while the engine is operatively de-coupled from the electric machine.

10. The controller of claim 7, wherein the disconnect clutch pre-stroke command includes a command to operate a transmission pump operatively coupled to the electric machine to provide hydraulic pressure to the disconnect clutch.

11. The controller of claim 8 wherein the control logic is further configured to, in response to the accelerator pedal position being less than the threshold accelerator pedal position, command the disconnect clutch to de-couple the engine from the electric machine.

12. The controller of claim 8 wherein the disconnect clutch couples the engine to the electric machine such that a slip condition occurs between components of the disconnect clutch.

13. The controller of claim 8 wherein the disconnect clutch couples the engine to the electric machine such that a no-slip condition occurs between components of the disconnect clutch as the electric machine and the engine approach a target speed.

14. A method of starting an engine comprising:
in response to an anticipated engine start request, increasing a hydraulic pressure provided to a disconnect clutch configured to couple the engine to a transmission as a brake pedal position decreases to less than a threshold position; and
stroking the disconnect clutch such that disconnect clutch elements come into contact proximate a touch point for a predetermined time period after the anticipated engine start request.

15. The method of claim 14 wherein the disconnect clutch elements come into contact proximate the touch point with a reduced torque carrying capacity.

16. The method of claim 14 wherein the anticipated engine start request is based on a brake pedal position becoming less than a threshold position and a distance between a vehicle and a target vehicle becomes greater than a threshold distance.

17. The method of claim 14 further comprising, in response to expiration of the predetermined time period without receiving an accelerator pedal tip-in greater than a threshold tip-in, de-stroking the disconnect clutch to decouple the engine from the transmission.

18. The method of claim 15 further comprising, in response to an accelerator pedal tip-in greater than a threshold tip-in, providing hydraulic pressure to the disconnect clutch such that the torque carrying capacity is increased as an engine speed and speed of an electric machine are increased.

19. The method of claim 18 wherein the hydraulic pressure is provided to the disconnect clutch by providing power to the electric machine to spin a pump coupled to the electric machine based on a driver demand associated with an accelerator pedal position.

* * * * *